Sept. 2, 1947.                    J. R. HICKS                    2,426,930
                          MOTION-TRANSMITTING MEANS
                          Filed Dec. 19, 1942
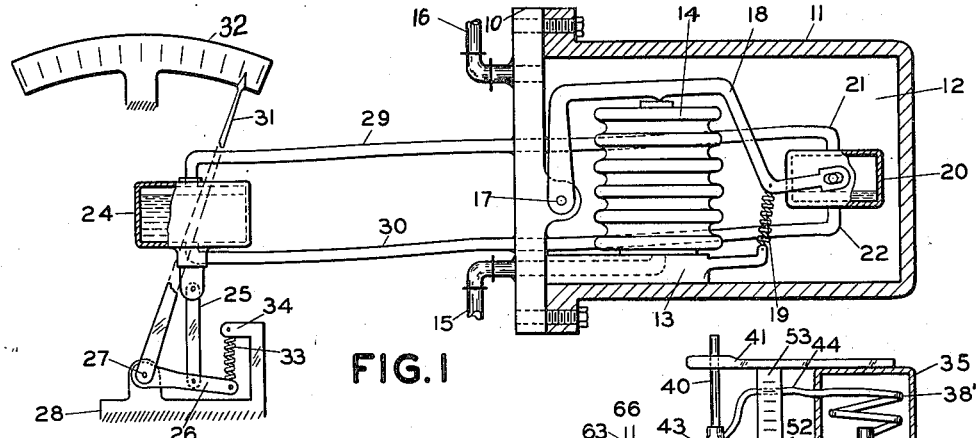
FIG. 1
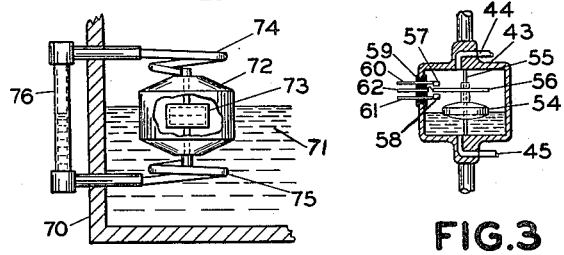
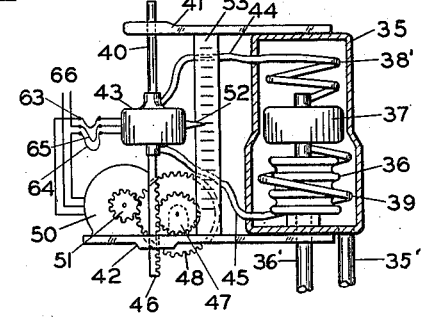
FIG. 4          FIG. 3          FIG. 2
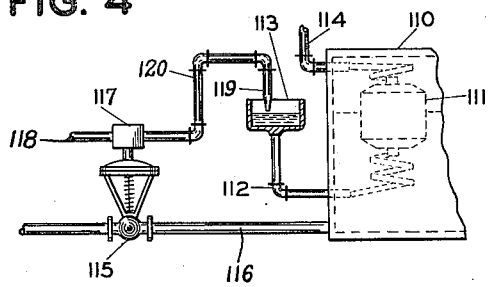
FIG. 7
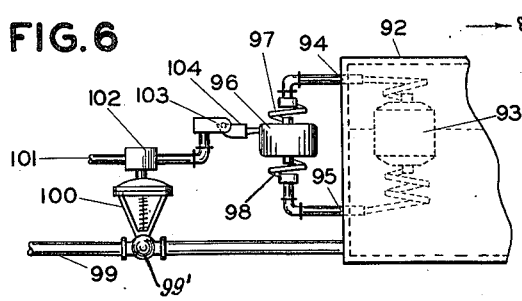
FIG. 6
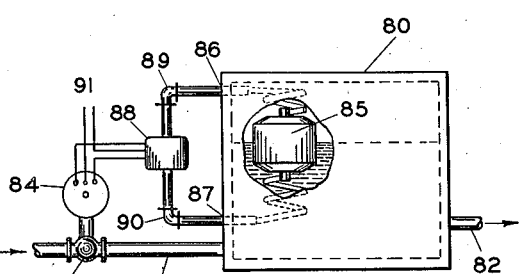
FIG. 5
INVENTOR.
James R. Hicks
BY
E. C. Sanborn
Attorney Patented Sept. 2, 1947

2,426,930

UNITED STATES PATENT OFFICE 2,426,930

MOTION-TRANSMITTING MEANS

James R. Hicks, Waterbury, Conn., assignor to The Bristol Company, Waterbury, Conn., a corporation of Connecticut Application December 19, 1942, Serial No. 469,585

23 Claims. (Cl. 137—68)

This invention relates to means for the transmission of limited motion through a rigid wall, and is especially applicable to incorporation in flow meters, manometers, liquid-level indicators and controllers, and in general to devices wherein it becomes desirable to obtain an indication, a record, or a control function representative of a motion taking place within a space which cannot expediently be placed in direct communication with the atmosphere.

Determination of fluid-flow and of liquid-level values must frequently be carried out under conditions in which the space containing the medium under measurement cannot be placed in communication with the atmosphere. The most common of these conditions is found where the medium is at a static pressure other than atmospheric; and another common condition of like limitation is found either where the measured medium is of a corrosive or poisonous nature which may not be released to the external atmosphere with safety, or where said medium is of a nature which would itself be contaminated by contact with the air or its component gases.

It is an object of this invention to provide means whereby the motion of a deflecting element enclosed in a space out of communication with the atmosphere may be communicated to or reproduced by deflecting means exterior to said space and accessible for purposes of observation or control, or for direct connection to other mechanisms.

It is a further object to provide for the above purpose means which shall effect said communication without leakage or friction or the necessity for weakening the walls of the enclosed space.

In effecting the purposes of the invention it is proposed to provide within an enclosed space wherein exists a variable magnitude to be determined, a chamber or vessel sealed from said space, and, by means of a heavy liquid contained in flexible tubular connecting elements passing through the wall of said space to communicate the movements of said vessel to suitable external measuring or controlling means.

Fig. 1 is a side elevation, partly in section, of a manometer embodying the principles of the invention.

Fig. 2 is a side elevation, partly in section, of a manometer embodying the principles of the invention, and adapted to the use of an electrical servomotor.

Fig. 3 is a sectional view of a detail of the mechanism of the form of the invention shown in Fig. 2.

Fig. 4 is a side elevation, partly in section, of a liquid-level gauge embodying the principles of the invention.

Figs. 5, 6, and 7 are views of alternative forms of the invention adapted to the control of liquid level in enclosed spaces.

Referring now to the drawings: In Fig. 1 is shown a manometer adapted to the continuous measurement of differential pressures, as for example the pressures developed across an orifice or a Venturi tube in the measurement of flow. Mounted upon a base plate 10 is an enclosing member 11 forming with said base plate a sealed chamber 12 adapted to be subjected internally to the maximum static pressure involved in the system under measurement. Fixed to a bracket 13 carried by the base plate 10 is an expansible bellows member 14 enclosed within the chamber 12 and having its interior space in communication with a conduit 15 passing through the plate 10 and adapted to be subjected to one of the two pressures whose differential is to be determined. A conduit 16 passes through the plate 10 and communicates with the interior space in the chamber 12. Pivotally mounted for rotation through a limited angle about a horizontal axis 17 within the chamber 12 is a lever arm 18 engaging the bellows member 14 to be deflected thereby, and constrained for deflection to an extent proportional to the applied force by means of a spring 19 extended between said lever arm and the bracket 13 carried by the base plate 10. Supported by the extremity of the lever arm 18 is a closed vessel or reservoir 20 having in communication with its top and bottom portions respectively flexible tubes or conduits 21 and 22, preferably of seamless metal construction, both of which pass through the base plate 10 and are sealed thereto by welding or otherwise. The flexibility of the conduits 21 and 22 is such that the reservoir 20 may be moved vertically throughout the range of motion determined by the extension of the bellows 14; and the position of said reservoir as constrained by the elasticity of said tubes coupled with that of the spring 19 will become a measure of the pressure differential between the conduits 15 and 16.

The element by which there is determined a quantitative measure of the vertical position of the vessel 20 may take any one of a number of different forms, that shown in Fig. 1 being of a simple or elementary nature. A container 24 is supported by a link member 25 carried on a short lever arm 26 pivotally mounted for rotation through a limited angle about a horizontal axis 27 carried by a fixed base 28, whereby said container may be moved through a vertical range of motion equivalent to that of the reservoir 20 with a corresponding angular motion of the lever arm 26. The top and bottom portions of the container 24 are connected by flexible tubes 29 and 30 to the tubes 21 and 22 respectively where they pass through the plate 18. The reservoir 20 and the container 24 together with the flexible conduits 21, 22, 29, and 30 thus constitute a closed system capable of containing liquid out of contact with the surrounding atmospheres. Within said closed system is placed an amount of a heavy liquid, such as mercury, equivalent to about half the volume of the enclosed space provided by said reservoir, container, and conduits. Attached to the lever arm 26 is an index or pointer 31 adapted to be angularly deflected about the axis 27 with said lever arm, and to provide on a graduated scale 32 an indication of the vertical position assumed by the container 24. A spring 33 extended between the arm 26 and a bracket 34 forming a part of the base 28 carries a part of the weight of the container 24 and its contained liquid, and, combining its influence with the elasticity of the conduits 29 and 30, serves to determine the position of the pointer 31 with respect to the scale 32.

The operation of the device may be explained as follows: Assuming the conduits 15 and 16 to be connected to sources of pressure whose differential it is required to determine, the bellows 14 will be extended to a degree determined by said pressure differential as related to the opposing elastic forces of the spring 19 and the tubes 21 and 22. The vertical position of the reservoir 20 will thus become a measure of said pressure differential. Reservoir 20 and container 24 being directly in communication with each other, and normally located within the same vertical zone of movement, the contained liquid will tend to equalize its level in said vessels, with the result that if the reservoir 20 rises there will be a flow of said liquid throuh the tubes 22 and 30 into the container 24, whereby the total weight of the container, will be increased, with a tendency for the same in response to the force of gravity to be deflected in a downward direction in opposition to the influence of spring 33, and to cause the pointer 31 to assume with respect to the scale 32 a position representative to the weight of the transferred liquid. The tubes 21 and 29 do not normally contain liquid, but serve to equalize the pressures upon the surfaces of liquid in the two movable chambers. Thus, any change in the pressure differential between the conduits 15 and 16 will be reflected in a movement of the reservoir 20 and a corresponding movement of the container 24 and the pointer 31 whereby said pointer provides at all times a measure of said pressure differential or of a magnitude represented thereby.

In Figs. 2 and 3 is shown a type of manometer adapted to the measurement of differential pressure and incorporating a servomotor mechanism whereby the power for positioning the indicating pointer is drawn from an outside source and controlled by deviations of the manometer element due to changes in the measured differential pressure. An enclosed chamber 35 contains an expansible bellows member 36 having one end fixed to the lower wall of the chamber and the other free to be deflected in a vertical sense in response to variations in the difference of interior and exterior pressures applied thereto. The interior of bellows 36 is placed in communication with one of the pressures whose differential is to be determined by means of a conduit 36'. The interior of the chamber 35 is placed in communication with the source of the other of the pressures to be measured by means of a conduit 35'. Carried by the upper end of the bellows 36, and displaceable therewith, is a reservoir 37 having its upper and lower portions respectively in communication with flexible tubes 38' and 39 passing through the wall of the chamber 35 and sealed thereto. Mounted upon a rod 40 slidably movable in a vertical sense through guides 41 and 42 attached to the chamber 35 is a container 43 having its upper and lower portions respectively placed in communication with the outlets of tubes 38' and 39 respectively by means of flexible conduits 44 and 45, and constituting therewith a closed system adapted to certain fluids.

The lower portion of the rod 40 bears a rack 46 meshing with a pinion 47 attached to a gear 48 journaled upon the guide 42. A reversible electric motor 50 carries upon its shaft a pinion 51 meshing with the gear 48, whereby upon rotation of the armature of said motor the rack 46 and the rod 40, carrying the container 43, will be displaced upward or downward according to the direction of rotation.

An index or pointer 52 cooperating with a vertically disposed graduated scale 53 provides a measure of the vertical displacement of the container 43. Within the closed system consisting of reservoir 37 and container 43, together with interconnecting flexible tubes, is placed an amount of heavy liquid, such as mercury, equivalent to about half the volume of the enclosed space provided.

The method by which the operation of the motor 50 is controlled to effect the positioning of container 43 will be understood by reference to Fig. 2 taken together with Fig. 3. Within the container 43 is a float member 54 having an annular conformation and constrained for vertical movement by means of a guide rod 55 fixed within said container. Carried by the float 54 is a contact member 56 adapted for movement between two stationary contacts 57 and 58 and to engage one or other of said contacts according to whether the surface of the liquid in the container 43 is above or below an intermediate position or datum line at which the contact 56 is free of engagement with either of the stationary contacts. Through an insulating bushing 59 are passed terminals 60 and 61 connected to the contacts 57 and 58 respectively, and a further terminal 62 flexibly connected to the movable contact element 56. Flexible conductors 63, 64 and 65 provide connections between the terminals 60, 61 and 62 respectively and an external electrical circuit supplied with current from a source 66, and adapted through a system of connection well known in the art of automatic control to operate the motor 50 in a direction corresponding to which of the two contacts 57 and 58 is in engagement with the contact 56, and to cause said motor to remain at rest when said last named contact is in a position intermediate said contacts 57 and 58. The connections of the electrical circuit are made such that should the float 54 be lifted due to a rise in the level of the liquid in the reservoir 43, causing contacts 56 and 57 to be brought into engagement, the motor 50 will operate in such a sense as to cause the container 43 to rise, and vice versa.

The operation of the device as shown in Figs. 2 and 3 is as follows: Should the pressure applied to the conduit 36' increase with respect to that applied to the conduit 35', the bellows 36 will tend to expand, causing the reservoir 37 to be raised through a corresponding distance. As a result of this movement, there will be a tendency for liquid to flow from the reservoir 37 through the tubes 39 and 45 into the container 43, lifting the float 54 and closing the contacts 56 and 57. As a result of the action of the contacts the motor 50 will be caused to operate in a sense to elevate the container 43, which action will continue until sufficient of the liquid in said container has flowed back into the reservoir 37 to cause the float 54 to be lowered with respect to the container 43, causing the contact 56 to be cleared from the contact 57 and the motor 50 brought to rest. In the same manner, should the pressure applied to the conduit 36' be lowered with respect to that applied to the conduit 35', the liquid levels will be changed in a sense to actuate the electrical contacts to cause the container 43 to be moved to a lower position. Thus, the control mechanism will at all times tend to maintain the surface of the liquid in the container 43 at a predetermined datum; and since the levels of the surfaces in the container 43 and the reservoir 37 respectively will be identical, the position of the index 52 with respect to the scale 53, will provide a measure of the vertical displacement of the container 43, and thus of the pressure differential existing between the conduits 36' and 35'.

In Fig. 4 is shown an application of the principle of the invention to providing an indication of the level of liquid in an enclosed space. A vertical wall 70 forms a portion of an enclosed chamber containing a quantity of water or other liquid 71 the level of whose surface it is desired to determine exteriorly to said vessel. Enclosed in said chamber and buoyed up by the body of liquid 71 is a hollow float member 72 adapted to be deflected in a vertical sense to a position corresponding to the level of the surface of said body of liquid. Within the float 72 is fixed an enclosed reservoir 73 adapted to contain liquid, and having its upper and lower portions respectively connected through the walls of the float 72 and to flexible tubes 74 and 75 which in turn pass through the vertical wall 70 in sealed relationship, providing connection between the interior of the reservoir 73 and space exterior to the vessel containing the liquid 71. Connected to the outer openings of the tubes 74 and 75 are the upper and lower ends respectively of a gauge glass 76 of the conventional type.

In operation, the enclosed space formed by the reservoir 73, the tubes 74 and 75, and the gauge glass 76 is partially filled with a heavy liquid, which will automatically adjust itself so that the surface level visible in the gauge glass 76 will be the same as that within the reservoir 73. As the level of the liquid 71 is varied, the vertical position of the float 72 and the enclosed reservoir 73 will be correspondingly changed. If the reservoir 73 rises there will be a tendency for liquid to flow therefrom through the tube 75 into the gauge glass 76, so that the surface of the liquid visible in said glass will be correspondingly elevated. In a similar manner, should the level of the body of liquid 71 be lowered, a portion of the liquid contained in the gauge glass 76 will tend to flow into the reservoir 73, with a corresponding lowering of the surface visible in the gauge glass. Thus, the height of the liquid in the gauge glass 76 will provide a measure of that of the body of liquid 71 without the pressure in the enclosed vessel being communicated to the interior of the gauge glass.

In Fig. 5 is shown an application of the principle of the invention to the regulation of liquid level in an enclosed space. An enclosed chamber 80 is adapted to be partially filled with liquid at a varying level depending upon the relative rate of admission of said liquid through a conduit 81 and discharge through a conduit 82. Connected in the conduit 81 is a valve 83 adapted for operation by an electric motor 84, whereby said valve may be opened or closed and brought to rest in any desired intermediate position. Contained within the chamber 80 is a float member 85 similar in all respects to the member 72 shown in Fig. 4, and having therein a liquid reservoir connected by means of flexible tubes to upper and lower outlets 86 and 87 in a manner identical to that in which the corresponding connections are made in the apparatus shown in Fig. 4. A stationary container 88 identical in structure and arrangement with the container 43 shown in Fig. 3, and having a similar system of electrical contacts, has its upper and lower portions respectively connected by means of rigid conduits 89 and 90 to the upper and lower outlets 86 and 87. The terminals of the contacts within the reservoir 88 are connected by a system of wiring well known in the art of automatic control to a source of electric power 91 and to the motor 84 in such a manner that a rise in the liquid level within the reservoir 88 will cause the motor 84 to be operated in a direction to close the valve 83 and a lowering of said level will cause the motor to be operated in a direction to open said valve.

The operation of the device will be readily understood by comparison with the apparatus shown in the preceding figures. If the level of the liquid within the chamber 80 should rise, the float 85 will be lifted by a corresponding amount and a portion of the liquid contained within its enclosed reservoir will be transferred to the stationary container 88 lifting the float therein, and causing the motor 84 to close the valve 83 with a consequent tendency to offset the rise in liquid level within the chamber 80. Similarly, should the liquid level within the chamber 80 tend to fall, the float 85 will assume a lower position, with a consequent reduction in the amount of liquid within the container 88, and an action on the part of the motor 84 to open the valve 83, causing the liquid level in the chamber 80 to be restored.

In Fig. 6 is shown means whereby the principles of the invention may be adapted to the control of liquid level through the instrumentality of a pneumatically operated valve. A chamber 92 adapted to contain liquid whose level is to be controlled, has positioned therein a float member 93 identical in structure and mounting with the float member 72 shown in Fig. 4, free for vertical displacement with variations of liquid level within said chamber, and having the upper and lower portion of its enclosed reservoir brought by means of flexible tubes to outlets 94 and 95 passing through the wall of the chamber 92. An enclosed container 96 adapted to contain liquid has its upper and lower portions connected to the outlets 94 and 95 respectively by flexible resilient conduits 97 and 98, whereby the reservoir 96 will be free to vary its vertical position in response to changes in the total weight of contained liquid as related to the resiliency of the conduits 97 and 98.

The liquid whose level is to be regulated is admitted to the chamber 92 through a conduit 99 having therein a valve 99' adapted for operation by means of a diaphragm top 100 receiving compressed air from a source 101 through a pneumatic relay 102 subject to control by the coaction of an orifice member 103 and a vane member 104 attached to, and movable with, the reservoir 96, whereby changes in the vertical position of said reservoir will cause the vane 104 to affect the escape of air from the orifice 103 and thus actuate the relay 102 to adjust the pressure in the diaphragm element 100, thereby regulating the degree of opening of the valve 99.

The pneumatic control thus briefly described may be of any one of a variety of such systems well known in the art of automatic regulations, and may advantageously be of the type fully set forth and described in U. S. Letters Patent 1,880,247, issued to Griggs and Mabey, October 4, 1932.

It will be observed that the actual pressure in the flexible connecting tubes bears no direct relation to the value of the measured magnitude. In general this pressure should be maintained at such a value that there will be no risk of the tubes within the measured chamber being crushed or otherwise deformed. Since tubing is much less subject to distortion by internal than by external pressures, it is logical that the pressure within the closed system including the flexible conduits should be maintained at a value more closely approaching that within the chamber than that of the atmosphere. This internal pressure may therefore be maintained at a value which will at all times exceed that within the chamber 12; or it may have a value intermediate that within the chamber 12 and atmospheric; or, where the pressure within the chamber is not sufficient to deform the flexible conduit, the system may be maintained at atmospheric pressure. In fact, under such conditions the upper part of the system may be directly in communication with the atmosphere.

In Fig. 7 is shown a form of the invention in which liquid level within the closed chamber is maintained by means of a pneumatically controlled valve whose position is regulated through the instrumentality of a float system similar to that disclosed in the preceding figures but in which the liquid in the measuring system is directly exposed to the atmosphere. A chamber 110 adapted to contain liquid whose level is to be controlled has positioned therein a float member 111 identical in structure and mounting with the float member 72 shown in Fig. 4, free for vertical displacement with variations of liquid level within said chamber, and having the lower portion of its enclosed reservoir connected by means of a flexible tube within said chamber to an outlet conduit 112 carrying a stationary open reservoir 113, so positioned that when said enclosed reservoir and open reservoir are partially filled with a heavy liquid, the range of vertical motion of the surface of said liquid within the chamber 113 will correspond with the range of motion of the liquid surface within the enclosed reservoir. The upper portion of the enclosed reservoir is connected by means of a flexible tube to an outlet 114, whereby atmospheric pressure is at all times maintained upon the surface of the liquid within said enclosed reservoir. Thus, as the float 111 within the chamber 110 is vertically displaced by changes in the liquid level within said chamber, the liquid level in the open reservoir 113 will be correspondingly varied.

Regulation of the level of liquid within the chamber 110 is carried out by means of a pneumatically actuated valve 115 in a conduit 116 through which said liquid is admitted to said chamber. Operation of the valve 115 is effected by means of a pneumatic relay 117 identical in all respects with the relay 102 shown in Fig. 6, and receiving compressed air from a source 118. A vertically disposed nozzle or jet 119 carried by a conduit 120 and communicating with relay 117 is positioned in close proximity to the surface of the liquid in reservoir 113, so that minute variations in the level of said surface will affect the degree to which the escape of air from said nozzle is obstructed by said liquid and thus modify the back-pressure applied in said relay and thereby operate the pneumatic valve system in a sense to maintain the liquid within the chamber 110 at a constant level.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for transmitting to one side of a sealed partition the position of an object located on the other side of said partition; said apparatus comprising a reservoir positionable vertically on the same side of said partition as, and in correspondence to the position of, said object, a container located on the side of said partition where said position is to be reproduced, and means comprising flexible conduit connections between said reservoir and said container for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir.

2. Apparatus for transmitting to the outside of a chamber values of a variable magnitude within said chamber, said apparatus comprising a reservoir adapted for vertical movement within said chamber in correspondence with said values, flexible conduit means extending between said reservoir and a wall of said chamber, a container external to said chamber, and adapted for limited vertical movement and having flexible conduit connection to said first-named flexible conduit means, and forming therewith and with said reservoir a liquid-containing system, the interior of said container providing a compartment having its upper and lower ends spaced by a distance sufficient to provide for free ascent of said liquid in said compartment out of contact with said upper end to enable the surfaces of said liquid in said reservoir and said compartment to be maintained at a common level throughout the range of vertical movement of said reservoir, and means affected by the volume of the liquid in said container for causing said container to assume a vertical position representative of the vertical position of said reservoir.

3. Apparatus for transmitting to the outside of a chamber values of a variable magnitude within said chamber, said apparatus comprising a reservoir adapted for vertical movement within said chamber in correspondence with said values, flexible conduit means extending between said reservoir and a wall of said chamber, a container external to said chamber, and adapted for limited vertical movement and having flexible conduit connection to said first-named flexible conduit means, and forming therewith and with said reservoir a liquid-containing system, the interior of said container providing a compartment having its upper and lower ends spaced by a distance sufficient to provide for free ascent of said liquid in said compartment out of contact with said upper end to enable the surfaces of said liquid in said reservoir and said compartment to be maintained at a common level throughout the range of vertical movement of said reservoir, and means affected by the level of the liquid in said container for causing said container to assume a vertical position representative of the vertical position of said reservoir.

4. Apparatus for transmitting to the outside of a chamber values of a variable magnitude within said chamber, said apparatus comprising a reservoir adapted for bodily vertical movement within said chamber in correspondence with said values, flexible conduit means extending between said reservoir and a wall of said chamber, a container external to said chamber, and adapted for limited bodily vertical movement and having flexible conduit connection to said first-named flexible conduit means, and forming therewith and with said reservoir a system for the free movement of a body of liquid between said reservoir and said container with changes in the relative vertical position thereof to maintain its surfaces therein at a common level, and means yieldingly supporting said container and adapted for displacement according to the volume of liquid in the same to provide a measure of the vertical position of said reservoir.

5. Apparatus for transmitting to space at atmospheric pressure a motion representative of a motion taking place in an enclosed space at a non-atmospheric pressure, including a reservoir vertically movable within said enclosed space through a range representative of said motion to be transmitted, flexible conduit means extending between said reservoir and a wall of said enclosed space, said conduit means being adapted to resist distortion by the differential pressure between atmospheric and that within said space, a container external to said space, means comprising said flexible conduit means providing connections between said reservoir and said container and forming therewith a liquid-containing system, the interior of said container providing a compartment having its upper and lower ends spaced by a distance sufficient to provide for free ascent of said liquid in said compartment out of contact with said upper end and to enable the surfaces of said liquid in said reservoir and compartment to be maintained at a common level throughout the range of vertical movement of said reservoir.

6. Apparatus for transmitting to space at atmospheric pressure a motion representative of a motion taking place in an enclosed space at a non-atmospheric pressure, including a closed reservoir vertically movable within said space through a range representative of said motion to be transmitted, a closed container external to said space, connections comprising flexible conduit means between said reservoir and said container and forming therewith a closed liquid-containing system isolated from both the atmosphere and said enclosed space, the interior of said container providing a compartment having its upper and lower ends spaced by a distance sufficient to provide for free ascent of said liquid in said compartment out of contact with said upper end and to enable the surfaces of said liquid in said reservoir and container to be maintained at a common level throughout the range of vertical movement of said reservoir, and means responsive to the volume of liquid in said container for movement to positions corresponding therewith.

7. Apparatus for measuring the difference between two fluid pressures, comprising an enclosed chamber to which one of said pressures may be applied, an expansible member within said chamber to which the other of said pressures may be applied and having a movable part adapted for displacement according to the difference between said pressures, a reservoir adapted for limited vertical movement within said chamber according to the deflection of said movable part, flexible conduit means extending between said reservoir and a wall of said chamber, a container external to said chamber, and means comprising said flexible conduit means providing connections between said reservoir and said container respectively and forming therewith a system for the free movement of a body of liquid between said reservoir and said container with changes in the relative position thereof to maintain its surfaces therein at a common level.

8. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means affected by the liquid level in said container and adapted to regulate the level of liquid in said enclosed space.

9. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means and adapted for limited vertical displacement corresponding to changes in the volume of liquid therein, together with control means subject to actuation in response to said displacement and adapted to regulate the level of liquid in said enclosed space.

10. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means subject to actuation in response to deviation of said last-named liquid level from a predetermined datum and adapted to regulate the level of liquid in said enclosed space.

11. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means including a control couple having a stationary part and a cooperating moving part movable in response to changes in the liquid level in said container and elements actuated by the cooperation of said parts to regulate the level of liquid in said enclosed space.

12. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means including a valve adapted to regulate the level of liquid in said enclosed space, motor means for operating said valve, and a control couple responsive to deviation of said last-named liquid level from a predetermined datum to command the action of said motor means.

13. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means including a valve adapted to regulate the level of liquid in said enclosed space, electric motor means for operating said valve, a source of electric power supply for said motor, a circuit for the same, and contacts in said circuit subject to actuation in response to deviation of said last-named liquid level from a predetermined datum, and adapted to control said electric motor means.

14. Apparatus for controlling the level of liquid in an enclosed space, including a float vertically displaceable with said level, a reservoir movable with said float, flexible conduit means extending between said reservoir and the enclosing wall of said space, a container external to said space and connected to said conduit means for forming therewith and with said reservoir a system for the transfer of liquid between said container and reservoir in response to vertical movement of said reservoir, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir, control means including a valve adapted to regulate the level of liquid in said enclosed space, fluid-pressure actuated motor means for operating said valve in response to variations in a back-pressure applied thereto, a nozzle providing an escape for pressure fluid therefrom, a vane cooperating with said nozzle to more or less obstruct the escape of pressure fluid according to the deviation of said last-named liquid level from a predetermined datum and thereby to affect the back pressure for commanding the operation of said valve.

15. Apparatus for transmitting to the outside of a chamber values of a variable magnitude within said chamber, said apparatus comprising a reservoir adapted for vertical movement within said chamber in correspondence with said values, flexible conduit means extending between said reservoir and a wall of said chamber, a container external to said chamber, means comprising said flexible conduit means providing connections between said reservoir and said container respectively and forming therewith a system for the free movement of a body of liquid between said reservoir and said container with changes in the relative position thereof, the interior of said container providing a compartment having its upper and lower ends spaced by a distance sufficient to provide for free ascent of said liquid in said compartment out of contact with said upper end to enable the surfaces of said liquid in said reservoir and compartment to be maintained at a common level throughout the range of vertical movement of said reservoir, and controlling means governed by the liquid in said container.

16. Apparatus for transmitting to the outside of a closed chamber values of a variable magnitude within said chamber, said apparatus comprising a measuring element having a part vertically deflectable with changes in said magnitude, a reservoir separate from, but movable with, said deflectable part, flexible conduit means extending between said reservoir and a wall of said chamber, a vertically movable container external to said chamber, means including said flexible conduit means providing connection between said reservoir and said container and forming therewith a system for the free movement of a liquid between said reservoir and said container in response to movement of said reservoir with said deflectable part to maintain the surfaces of said liquid in said container and said reservoir at a common level, and means partly within said container and governed by the liquid level therein, and adapted to maintain the surface of said liquid at a predetermined level with respect to said container.

17. Apparatus for transmitting to the outside of a closed chamber values of a variable magnitude within said chamber, said apparatus comprising a measuring element having a part vertically deflectable with changes in said magnitude, a reservoir separate from, but movable with, said deflectable part, flexible conduit means extending between said reservoir and a wall of said chamber, a vertically movable container external to said chamber, means including said flexible conduit means providing connection between said reservoir and said container and forming therewith a system for the free movement of a liquid between said reservoir and said container to maintain the surfaces of said liquid at a common level therein despite movement of said reservoir with said deflectable part, a float within said container and vertically movable therein independently of the movement of said container, and controlling means governed by the relative vertical position of said float and container and adapted to position the latter to maintain a predetermined vertical position with respect to said reservoir.

18. Apparatus for transmitting to the outside of a closed chamber values of a variable magnitude within said chamber, said apparatus comprising a measuring element having a part vertically deflectable with changes in said magnitude, a reservoir separate from, but movable with, said deflectable part, flexible conduit means extending between said reservoir and a wall of said chamber, a vertically movable container external to said chamber, and means including said flexible conduit means providing connection between said reservoir and said container and forming therewith a system for the transfer of a liquid between said container and said reservoir in response to vertical movement of the latter with said deflectable part, the interior of said container providing a compartment having its upper and lower ends spaced by a distance sufficient to provide for free ascent of said liquid in said compartment out of contact with said upper end to enable the surfaces of said liquid in said reservoir and compartment to be maintained at a common level throughout the range of vertical movement of said reservoir.

19. Apparatus for transmitting to one side of a sealed partition the position of an object located on the other side of said partition; said apparatus comprising a reservoir positionable vertically on the same side of said partition as, and in correspondence to the position of, said object, a container located on the side of said partition where said position is to be reproduced, and means comprising a pair of flexible conduit connections between said reservoir and said container for the transfer of liquid between said container and reservoir in response to vertical movement of said reservoir, said connections extending substantially horizontally and at different levels and forming with said reservoir and container an isolated closed system adapted to be partially filled with liquid, the interior of said container providing a chamber having its upper and lower ends spaced by a distance sufficient to provide for free ascent of said liquid in said chamber out of contact with said upper end to enable the surfaces of said liquid in said reservoir and chamber to be maintained at a common level throughout the range of vertical movement of said reservoir.

20. Apparatus for transmitting to the outside of a chamber values of a variable magnitude within said chamber, said apparatus comprising a reservoir adapted for bodily vertical movement within said chamber in correspondence with said values, a container external to said chamber and adapted for limited vertical movement, a pair of flexible conduits extending substantially horizontally through a wall of said chamber and positioned at different levels to interconnect the upper and the lower portions respectively of said reservoir and said container and forming therewith an isolated closed system adapted to be partially filled with liquid, the vertical spacing between the upper and lower ends of said container being sufficient to provide for free ascent of said liquid therein out of contact with said upper end, to enable the surfaces of said liquid in said reservoir and said container to be maintained at a common level throughout the range of vertical movement of said reservoir, and means responsive to the volume of the liquid in said container for causing said container to assume a vertical position representative of the vertical position of said reservoir.

21. Apparatus for transmitting to the outside of a chamber values of a variable magnitude within said chamber, said apparatus comprising a reservoir adapted for bodily vertical movement within said chamber in correspondence with said values, a container external to said chamber and adapted for limited vertical movement, a pair of flexible conduits extending substantially horizontally through a wall of said chamber and positioned at different levels to interconnect the upper and the lower portions respectively of said reservoir and said container and forming therewith an isolated closed system adapted to be partially filled with liquid, the vertical spacing between the upper and lower ends of said container being sufficient to provide for free ascent of said liquid therein out of contact with said upper end, to enable the surfaces of said liquid in said reservoir and said container to be maintained at a common level throughout the range of vertical movement of said reservoir, and means responsive to the level of the liquid in said container for causing said container to assume a vertical position representative of the vertical position of said reservoir.

22. Apparatus for transmitting to space at atmospheric pressure a motion representative of a motion taking place in an enclosed space at a non-atmospheric pressure, including a reservoir vertically movable within said enclosed space through a range representative of said motion to be transmitted, a pair of flexible conduits extending substantially horizontally and at different levels between said reservoir and a wall of said enclosed space, said conduits being adapted to resist distortion by the differential pressure between atmospheric and that within said space, a container external to said space, means comprising said flexible conduit means providing connections between said reservoir and said container and forming therewith an isolated closed system adapted to be partially filled with liquid, the interior of said container providing a compartment having its upper and lower ends spaced by a distance sufficient to provide for free ascent of said liquid in said compartment out of contact with said upper end and to enable the surfaces of said liquid in said reservoir and compartment to be maintained at a common level throughout the range of vertical movement of said reservoir.

23. Apparatus for transmitting to the outside of a chamber values of a variable magnitude within said chamber, said apparatus comprising a reservoir adapted for vertical movement within said chamber in correspondence with said values, a pair of flexible conduits extending substantially horizontally and at different levels between said reservoir and a wall of said chamber, a container external to said chamber, means comprising said flexible conduits providing connections between said reservoir and said container respectively, and forming therewith an isolated closed system for the free movement of a body of liquid between said reservoir and said container with changes in the relative position thereof, the interior of said container providing a compartment having its upper and lower ends spaced by a distance sufficient to provide for free ascent of said liquid in said compartment out of contact with said upper end to enable the surfaces of said liquid in said reservoir and compartment to be maintained at a common level throughout the range of vertical movement of said reservoir, and controlling means governed by the liquid in said container.

JAMES R. HICKS.

REFERENCES CITED

The following references are of record in the file of this patent:

UNITED STATES PATENTS

| Number | Name | Date |
| --- | --- | --- |
| 2,325,714 | Stover | Aug. 3, 1943 |
| 1,881,266 | De Giers | Oct. 4, 1932 |
| 723,040 | Schmitz | Mar. 17, 1903 |
| 1,695,471 | Roucka | Dec. 18, 1928 |
| 1,575,816 | Carlstedt | Mar. 9, 1926 |
| 2,277,768 | Mason | Mar. 31, 1942 |
| 2,069,959 | Kuljian | Feb. 9, 1937 |
| 2,133,190 | Dalton | Oct. 11, 1938 |
| 1,698,969 | Sartakoff | Jan. 15, 1929 |

FOREIGN PATENTS

| Number | Country | Date |
| --- | --- | --- |
| 249,127 | Germany | July 11, 1912 |
| 415,400 | Germany | June 29, 1925 |